US012626409B2

(12) United States Patent
Dijkstra-Soudarissanane et al.

(10) Patent No.: US 12,626,409 B2
(45) Date of Patent: May 12, 2026

(54) ENCODING AND DECODING VIEWS ON VOLUMETRIC IMAGE DATA

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Sylvie Dijkstra-Soudarissanane, Delft (NL); Hendrikus Nathaniël Hindriks, Gouda (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 422 days.

(21) Appl. No.: 17/780,289

(22) PCT Filed: Dec. 4, 2020

(86) PCT No.: PCT/EP2020/084685
§ 371 (c)(1),
(2) Date: May 26, 2022

(87) PCT Pub. No.: WO2021/110940
PCT Pub. Date: Jun. 10, 2021

(65) Prior Publication Data
US 2023/0042078 A1     Feb. 9, 2023

(30) Foreign Application Priority Data
Dec. 6, 2019   (EP) ..................................... 19214048

(51) Int. Cl.
G06T 9/00       (2006.01)
G06T 15/20      (2011.01)

(52) U.S. Cl.
CPC .............. *G06T 9/001* (2013.01); *G06T 15/20* (2013.01)

(58) Field of Classification Search
CPC ......... G06T 9/001; G06T 15/20; G06T 15/00; G06T 15/005; G06T 15/08
See application file for complete search history.

(56) References Cited

U.S. PATENT DOCUMENTS 10,074,160 B2 *  9/2018  Kim ......................... G06T 17/20
10,593,066 B1 *  3/2020  Dhua ........................ G06T 7/70
(Continued)

FOREIGN PATENT DOCUMENTS

EP            3562159 A1 *  10/2019  ............... G06T 9/00
WO      WO 2018/215502 A1   11/2018
(Continued)

OTHER PUBLICATIONS

S. Schwarz et al., "Emerging MPEG Standards for Point Cloud Compression," in IEEE Journal on Emerging and Selected Topics in Circuits and Systems, vol. 9, No. 1, pp. 133-148, Mar. 2019, doi: 10.1109/JETCAS.2018.2885981. (Year: 2019).*
(Continued)

*Primary Examiner* — Utpal D Shah
*Assistant Examiner* — Jack Peter Kraynak
(74) *Attorney, Agent, or Firm* — Hamilton, Brook, Smith & Reynolds, P.C.

(57)              ABSTRACT

An encoding method comprises obtaining (101) an input set of volumetric image data, selecting (103) data from the image data for multiple views based on a visibility of the data from a respective viewpoint at a respective viewing direction and/or within a respective field of view such that a plurality of the views comprises only a part of the image data, encoding (105) each of the views as a separate output set (31), and generating (107) metadata which indicates the
(Continued)

viewpoints. A decoding method comprises determining (121) a desired user viewpoint, obtaining (123) the metadata, selecting (125) one or more of the available viewpoints based on the desired user viewpoint, obtaining (127) one or more sets of image data in which one or more available views corresponding to the selected one or more available viewpoints have been encoded, and decoding (129) at least one of the one or more available views.

15 Claims, 6 Drawing Sheets

(56)                    References Cited

U.S. PATENT DOCUMENTS

| | | | |
|---|---|---|---|
| 10,902,679 B2 * | 1/2021 | Molyneaux | G06T 7/187 |
| 2017/0358126 A1 * | 12/2017 | Lim | G06T 17/20 |
| 2018/0122129 A1 * | 5/2018 | Peterson | H04N 21/854 |
| 2019/0172249 A1 * | 6/2019 | Kaza | G06T 15/08 |
| 2019/0394488 A1 * | 12/2019 | Alpaslan | H04N 19/597 |
| 2020/0159239 A1 * | 5/2020 | Li | G06T 7/74 |
| 2021/0192793 A1 * | 6/2021 | Engelland-Gay | G06T 3/40 |
| 2022/0138990 A1 * | 5/2022 | Fleureau | G06T 9/001 |
| | | | 382/232 |

FOREIGN PATENT DOCUMENTS

| | | |
|---|---|---|
| WO | WO 2019/226865 A1 | 11/2018 |
| WO | WO 2019/079032 A1 | 4/2019 |

OTHER PUBLICATIONS

Epic Games Inc., "Visiblity and Occlusion Culling," 2019. [Online]. Available: https://docs.unrealengine.com/en-US/Engine/Rendering/VisibilityCulling/index.html (Year: 2019).*

S.-W. Jeong and J.-Y. Sim, "Saliency Detection for 3D Surface Geometry Using Semi-regular Meshes," in IEEE Transactions on Multimedia, vol. 19, No. 12, pp. 2692-2705, Dec. 2017, doi: 10.1109/TMM.2017.2710802. (Year: 2017).*

Lamboray, E., Waschbüsch, M., Würmlin, S., Pfister, H., & Gross, M.H. (2003). Dynamic Point Cloud Compression for Free Viewpoint Video. (Year: 2003).*

International Preliminary Report on Patentability for Int'l Application No. PCT/EP2020/084685, titled: Encoding and Decoding Views On Volumetric Image Data, Date of Issuance: May 17, 2022.

3DG, N18487 V-PCC Codec Description, Geneva: MPEG internal document, Approved, 2019.

Epic Games Inc., "Visiblity and Occlusion Culling," 2019. [Online]. Available: https://docs.unrealengine.com/en-US/Engine/Rendering/VisibilityCulling/index.html. [Accessed May 8, 2019].

Google, "Welcome to Light Fields—Steam page," Mar. 14, 2018. [Online]. Available: https://store.steampowered.com/app/771310/Welcome_to_Light_Fields/. [Accessed Aug. 1, 2019].

IETF, "JavaScript Session Establishment Protocol [draft-ietf-rtcweb-jsep-26]," Feb. 27, 2019. [Online]. Available: https://tools.ietf.org/html/draft-ietf-rtcweb-jsep-26. [Accessed Jul. 26, 2019].

Ilola, L. et al., "On 3d tiling related discussion," Palo Alto: MPEG internal document, 2019.

Jeworutzki, A., "XNA 4 tutorial: Frustum Culling and Occlusion Culling," Mar. 1, 2011. [Online]. Available: http://www.andrejeworutzki.

de/game-developement/xna-4-tutorial-frustum-and-occlusion-culling/. [Accessed May 12, 2018].

Mammou, K. et al., "Video-based and Hierarchical Approaches Point Cloud Compression," Macau, China: Apple Inc, Winner of the CfP, MPEG Internal Document, 2017.

Masserann, A., Calvin1602 and Whiteseeker, "Tutorial 14 : Render to Texture," Feb. 23, 2018. [Online]. Available: https://www.opengl-tutorial.org/intermediate-tutorials/tutorial-14-render-to-texture/. [Accessed Aug. 8, 2019].

Microsoft, "Graphics Pipeline—Windows Applications," May 31, 2018. [Online]. Available: https://docs.microsoft.com/en-us/windows/desktop/direct3d11/overviews-direct3d-11-graphics-pipeline. [Accessed Jul. 26, 2019].

MPEG Systems, Information technology—Coded representation of immersive media—Part 10: Carriage of Point Cloud Data (WD), Geneva: MPEG internal document, 2019.

Open Geospatial Consortium, "3D Tiles Specification," Jun. 4, 2018. [Online]. Available: https://github.com/AnalyticalGraphicsInc/3d-tiles/blob/master/specification/specification.pdf. [Accessed Jul. 26, 2019].

O'Rourke, J., *Art Gallery Theorems and Algorithms*, Oxford University Press, 1987, pp. 230-234.

Persistence of Vision Raytracer Pty. Ltd., "Tutorial Section 1," 2011. [Online]. Available: https://www.povray.org/documentation/3.7.0/t2_1.html#t2_1_2. [Accessed Aug. 8, 2019].

Rhee, T. et al., "MR360: Mixed Reality Rendering for 360° Panoramic Videos," IEEE Transactions on Visualization and Computer Graphics, vol. 23, No. 4, pp. 1379-1388, 2017.

The Khronos Group Inc, "Renderling Pipeline Overview—OpenGL Wiki," Apr. 2019. [Online]. Available: https://www.khronos.org/opengl/wiki/Rendering_Pipeline_Overview. [Accessed Jul. 26, 2019].

The Mathworks, Inc., "Merge two 3-D point clouds—MATLAB pcmerge," 2019. [Online]. Available: https://nl.mathworks.com/help/vision/ref/pcmerge.html. [Accessed Jul. 26, 2019].

The Mathworks, Inc., "The PLY Format—MATLAB & Simulink—MathWorks Benelux," 2019. [Online]. Available: https://nl.mathworks.com/help/vision/ug/the-ply-format.html. [Accessed Jul. 26, 2019].

Unity Technologies, "Unity 2019.2 Manual: Occlusion Culling," Jul. 29, 2019. [Online]. Available: https://docs.unity3d.com/Manual/OcclusionCulling.html. [Accessed Aug. 5, 2019].

Vosoughi, A. et al., "[V-PCC] [CE2.19 Report] Content-aware PCC supporting selective quality compression, random-access, and parallel encoding/decoding," Marrakesh: MPEG internal document, 2019.

Vosoughi, A. et al., V-PCC Core Experiment 2.19 on tiles, Geneva: MPEG internal document, 2019.

European Search Report for European Application No. EP 19214048.1, titled: Encoding and Decoding Views on Volumetric Image Data, Dated: May 14, 2020.

International Search Report and Written Opinion for Int'l Application No. PCT/EP2020/084685, titled: Encoding and Decoding Views on Volumetric Image Data, Dated: Feb. 8, 2021.

Lamboray, E. et al., "Dynamic Point Cloud Compression for Free Viewpoint Video," ETH CS Technical Report #430, 9 pages (Dec. 10, 2003), Retrieved from Internet at: https://www.research-collection.ethz.ch/bitstream/handle/20.500.11850/69765/eth-4741-01.pdf?sequence=1&isAllowed=v.

Schwarz, S. et al., "Emerging MPEG Standards for Point Cloud Compression," IEEE Journal on Emerging and Selected Topics in Circuits and Systems, vol. 9, No. 1: 133-148 (Mar. 2019).

* cited by examiner

400

ENCODING AND DECODING VIEWS ON VOLUMETRIC IMAGE DATA

This application is the U.S. National Stage of International Application No. PCT/EP2020/084685, filed on Dec. 4, 2020, which designates the U.S., published in English, and claims priority under 35 U.S.C. § 119 or 365 (c) to European Application No. EP 19214048.1, filed on Dec. 6, 2019. The entire teachings of the above applications are incorporated herein by reference.

FIELD OF THE INVENTION

The invention relates to an encoder system for encoding volumetric image data, e.g. a point cloud, and a decoder system for decoding encoded volumetric image data.

The invention further relates to a method of encoding volumetric image data and a method of decoding encoded volumetric image data.

The invention also relates to a computer program product enabling a computer system to perform such methods.

BACKGROUND OF THE INVENTION

Augmented Reality (AR) and Virtual Reality (VR) offer a compelling set of use cases, such as remotely attending live sports, shared and social VR, (serious) gaming and training and education. Such experiences allow viewers to connect over large distances. For truly immersive experiences in both AR and VR, a viewer requires six degrees of freedom (6DoF). That is, when wearing a head-mounted AR goggle or VR display, the viewer should experience changes in the environment when moving his/her head in all directions, i.e. when changing head position forward/backward (surge), up/down (heave) and left/right (sway) combined with changes in orientation through rotation along the lateral (yaw), transverse (pitch) and longitudinal (roll) relative axes and more generally when moving his/her head while his/her head may stay still with respect to his/her body.

Volumetric formats are required to describe and thereby allow rendering of environments in which viewers can have 6DoF experiences. One aspect of such volumetric formats are volumetric video formats which have been created to describe volumetric environments which are dynamically changing over a given time. The AR and VR industry is moving towards such formats. For example, in the aforementioned use cases, the image of users could be made more realistic by using volumetric capture models.

Volumetric image data may comprise Point Clouds (PCs), voxels or volumetric (polygon) meshes, for example. Meshes are used to describe 3D models in games, for example. Point clouds can be used to describe volumetric objects as a set of points, which can be then be used in virtual scenes. A point cloud is a method for representing 3D data using a (usually very large) set of three dimensional $(x,y,z) \in \mathbb{R}^3$ points, here x,y,z usually refer to Cartesian coordinates, but other formats also exist (e.g. a 3D reference point (e.g. [0,0,0]) with angles x,y on a sphere with radius z). Depending on the type of data which is being represented, each point can have additional attributes (for example colour, reflectance, surface orientation, timestamp, movement) assigned to it.

Points within a point cloud are normally considered to have a volume of zero (in other words: are normally considered to have no defined size/dimension). In order to meaningfully render such points, multiple techniques have been described in literature. In one of the more trivial methods, a thickness value is assigned to each point before or during rendering. Using this thickness, it is possible to represent each point with a 3D object (e.g. tiny spheres, voxels, hexagons or other shapes) such that it becomes visible and can hide other points which are behind it.

Point clouds are well suited as a storage format for outputs from a range of measurement and capture devices. In particular, an RGB camera combined and synchronized with an infrared time-of-flight (ToF) sensor (e.g. the Microsoft Kinect) is commonly used to sense depth and colour information which can be combined and represented as a point cloud. Another technology which has resulted in the use of point clouds is LiDAR, a technology mainly known for self-driving cars and remote sensing.

A mesh is a 3D structure which is composed of multiple connected points or vertices. Vertices can be connected and closed to form (planar) faces. Graphics cards (GPUs) are typically optimized for rendering sets of large meshes consisting of three- or four-sided faces. Objects can be better approximated by increasing the number of vertices. Meshes can be constructed programmatically, and/or be defined using 3D modelling software. There are also many methods for unambiguously storing mesh data, and as such there are many public and proprietary formats for this purpose, like the 3DS, OBJ, GLTF and PLY formats, for example.

Voxels or 'volumetric pixels' are a data structure used for representing volumetric data. Commonly, voxels are defined on a 3D 'voxel grid' consisting of similar sized cells. In practice, voxels are used for representing various volumetric measurements and samplings with applications in medical, geospatial fields as well as more generally in computer graphics. As such, voxels are commonly found in representations of MRI, CT and ultrasound scans, satellite measurements and terrain heightmaps.

When rendering 3D scenes, usually more is described (e.g. an entire scene) than what is eventually visible to a user (e.g. the view). This fact is typically used in the graphics pipeline to optimize the rendering function by first detecting and then disregarding (parts of) objects which will not affect the user's view. In general, this type of operation is known as "culling" (e.g. the removal of unwanted objects). Two important types of culling are "view-frustum culling" and "occlusion culling".

The most straightforward form of culling, view-frustum culling, removes objects which are not in the viewing volume(s) of the virtual camera object(s). In practice, such camera objects are often modelled using a pyramid (as the virtual screen is square) with 'close' and 'far' (the minimum and maximum drawing distance) planes being cut off, the resulting object is known as a 'frustum'. The view-frustum culling algorithm involves the detection of objects which are inside the frustum volume and removing, that is culling, (parts of) all other objects, as they will not be visible.

Additionally, "occlusion culling" is another commonly used technique to select only the content that is visible from a given viewpoint. All (parts of) objects occluded by other objects in the line of sight of the viewer are not considered for rendering. The detection of occlusion in a scene from a certain view point is a well-known problem in computer graphics, where many algorithms were developed which attempt to solve the more generic 'hidden-surface problem' (and its analogue, the 'visible-surface problem'), which is the problem of, given a certain view point, determining which (parts of) surfaces in a scene are invisible (and hence can be removed without affecting the output of a rendering algorithm). A vast amount of literature is available on this topic and implementations of such algorithms exist in current state-of-the-art systems.

Rendering engines (such as the Unity and Unreal game engines) often provide an occlusion culling mechanism before the rendering phase. The occlusion culling process will go through a scene by means of a set of virtual cameras and determine the visible parts of the scene from the point of view of each virtual camera. Only visible objects will eventually be rendered. The occlusion culling process takes up most of the computation time during the content rendering.

The larger the volumetric image data, e.g. point cloud, that is provided to a rendering system for rendering, the more processing (including culling) needs to be performed.

This causes a lot of computation time to be taken up at the rendering system. It is therefore desirable to reduce, as much as possible, the size of the volumetric image data that is provided to the rendering system for rendering.

The Cesium platform for 3D geospatial data, which includes CesiumJS and Cesium ion, has been developed by a company called Cesium. The platform provides techniques which also reduce the size of volumetric image data that is provided to a rendering system for rendering. The Cesium platform uses 3D tiles to achieve this. Cesium tiles use a literal spatial (e.g. geographical) segmentation and has as goal to efficiently stream (and display) point clouds from a large area. The large area is composed of many point clouds, but the use of 3D tiles makes it possible to request only the desired data. A drawback of the Cesium platform is that is has been designed for 3D geospatial data and not for augmented and/or virtual reality content. An additional drawback is that the Cesium tiles are defined by an arbitrary splitting of the 3D space decoupled from any viewing position. As a result, data inside Cesium tiles may or may not be visible from a certain viewing position which means that the client rendering the large point cloud would require to download Cesium tiles that contain occluded data for this rendered viewing position.

SUMMARY OF THE INVENTION

It is a first object of the invention to provide an encoder system, which limits the amount of volumetric image data to be transmitted.

It is a second object of the invention to provide a decoder system, which uses limited hardware resources for rendering volumetric image data.

It is a third object of the invention to provide a method of encoding volumetric image data, which limits the amount of volumetric image data to be transmitted.

It is a fourth object of the invention to provide a method of decoding encoded volumetric image data, which requires limited hardware resources for rendering volumetric image data.

In a first aspect of the invention, an encoder system comprises at least one processor configured to obtain an input set of volumetric image data, select data from said volumetric image data for each of a plurality of views on said volumetric image data based on a visibility of said data from a respective viewpoint at a respective viewing direction and/or within a respective field of view such that a plurality of said views comprises only a part of said volumetric image data, encode each of said views as a separate output set of volumetric image data, and generate metadata, said metadata indicating said plurality of viewpoints.

By segmenting the input set of volumetric image data, e.g. into frustum, pyramid or cone-shaped views, and by performing view-frustum culling (and optionally occlusion culling, typically to remove fully occluded data and not partially occluded data) on these input sets, it becomes possible for the encoder system to transmit a limited amount of content to a decoder system. This enables the decoder system to only obtain a part of the input set. i.e. the part necessary to decode sufficient volumetric image data for rendering the input set from a desired user viewpoint. This limits the amount of volumetric image data that a decoder system needs in order to render content, for example augmented and/or virtual reality content (without requiring any specific action to limit the amount of this volumetric image data to a certain maximum). As a result of the limited size of the volumetric image data, the decoder system needs to spend limited/less computation resources (and typically limited/less memory and storage) on rendering invisible points or on frustum culling and occlusion culling and the use of network resources such as bandwidth may also be limited/reduced compared to a system that transmits the entire input set of volumetric image data, e.g. entire point clouds, or a partial set but containing occluded data that is useless for rendering, e.g. the arbitrary "cubes" of points that are transmitted as tiles by Cesium.

Said views may be shaped like a frustum, pyramid or cone, for example. A single wide view (e.g. frustum-shaped) may be used to render the view of two eyes simultaneously, for example. Said metadata is associated with said plurality of viewpoints and comprises 3D position information. Said metadata may describe other characteristics of each view, e.g. viewing direction and/or field of view. Inclusion of the viewing direction and/or field of view in the metadata is beneficial if the views do not all have the same viewing direction and/or field of view, e.g. if one or more of the viewpoints are inside a point cloud, and viewpoints are not associated with default viewing directions. Multiple output sets may be associated with the same metadata/viewpoints, e.g. if the multiple output sets represent multiple qualities of the same content. Information specifying which viewpoints and/or viewing directions and/or fields of view are to be used may be obtained from input data, e.g. as part of or separate from the same input data that comprises the input set. The viewing directions and/or fields of view may alternatively be default viewing directions and/or default fields of view, for example. In this specification, encoded volumetric data is also referred to as "volumetric data" even though it is only indirectly volumetric (i.e. through decoding).

A default viewing direction and/or field of view is a viewing direction and/or field of view that is known at runtime and is not provided in signalling information. Different use-cases may use different default values. A default value may be dynamically dependent on another default value (but only one set of (static+dynamic) default parameters normally exists for any set of static default parameters). The decoder system and encoder may be enabled to obtain the default values, for example, by compiling the default values into the software, by specifying rules (e.g. in a standard) how the default values can be calculated/determined, or by having another component determine the values and provide them as input to the encoder system and decoder system.

Said at least one processor may be configured to select said data from said volumetric image data for each of said plurality of views by selecting, for each respective view, all of said volumetric image data which is visible from said corresponding viewpoint at said corresponding viewing direction and/or within said corresponding field of view from said volumetric image data. Alternatively, some data that is visible from the respective viewpoint at the respective viewing direction may be omitted, e.g. if this data does not add much to the rendering, to further limit the total amount of volumetric image data, or just to reduce encoding work/time. For example, at certain viewing directions, two points that do not overlap in a point cloud may significantly overlap (and one of them may barely be visible) when they are rendered, and they may therefore not need to both be rendered.

Said at least one processor may be configured to select further data for said plurality of views based on a visibility of said further data from one or more respective further viewpoints, said one or more respective further viewpoints being related to said respective viewpoint. The data and the further data may correspond to adjacent or partially overlapping views, for example. Since the desired user viewpoint is often not the same as one of the available viewpoints, some adjustment is typically needed by a decoder system to adjust a decoded view to the desired user viewpoint. Typically, some data visible from the selected available viewpoint is not visible from the desired user viewpoint and therefore omitted in the rendered view. Furthermore, some data that is visible from the desired user viewpoint is not visible from the selected available viewpoint. By providing further data than only the data that is visible from the respective viewpoint at the respective viewing direction and/or within the respective field of view in the views, data that is visible from the desired user viewpoint and not visible from the available viewpoint can still be rendered.

Alternatively, the decoder system could obtain multiple views and fuse these views. In both cases, the computation time needed for frustum culling and occlusion culling and/or rendering invisible data would normally be less than if the entire input set would be provided to the decoder system for rendering. The further data for a certain viewpoint may be selected by virtually moving this certain viewpoint or by selecting data near the data already selected for the view. The former leads to the best results (e.g. no omitted data), but the latter can be performed quicker.

Said at least one processor may be configured to specify in said metadata where to obtain said output sets of volumetric image data or parts of said output sets of volumetric image data. This gives the decoder system full control over which output sets/views to obtain. Said metadata may be specified in a manifest file, e.g. a Media Presentation Description (MPD) for MPEG-DASH (ISO/IEC 23009-1), for example. In another embodiment, said metadata may be specified in an ISO Base Media File Format (ISOBMFF) data format where each output sets of volumetric image data could be encapsulated into different tracks into the same ISOBMFF (ISO/IEC 14496-12) file.

Said input set of volumetric image data may comprise one or more point clouds. Point clouds are relatively easy to segment into views, e.g. a subset of a point cloud is valid without further processing. If the volumetric image data comprises multiple point clouds, these point clouds compose a single scene, i.e. are related in space. For example, one point cloud may represent a table in a room and another point cloud may represent a chair in the same room. If the volumetric image data comprises multiple point clouds, it may be possible to perform culling only on a subset of these multiple point clouds. Although 3D meshes may also be segmented into views, this may require that new polygons are created to replace original polygons, e.g. because part of these original polygons are occluded in a certain view. Other examples of volumetric image data are RGB+D image data and voxels. Said input set of volumetric image data may change over time and said at least one processor may be configured to repeatedly select said data from said volumetric image data for each of said views and encode each of said views as separate bitstreams.

Said plurality of views may collectively comprise all of said volumetric image data. This allows the user to view all of the volumetric image data by changing the user viewpoint. Alternatively, some of the data may not be in any of the views, e.g. because they are hidden from every viewpoint.

In a second aspect of the invention, a decoder system comprises at least one processor configured to determine a desired user viewpoint, obtain metadata associated with encoded volumetric image data, said metadata indicating available viewpoints, each of said available viewpoints corresponding to an available view, select one or more of said available viewpoints based on said desired user viewpoint, obtain, based on said selected one or more viewpoints, one or more sets of volumetric image data in which one or more available views corresponding to said selected one or more available viewpoints have been encoded, decode at least one of said one or more available views from said one or more sets of volumetric image data, and optionally render said at least one of said decoded one or more available views (or part thereof). The term viewpoint refers to a position. Multiple views are possible from a certain viewpoint, e.g. depending on the viewing direction.

Said decoder system may be a mobile device or part of a mobile device, for example. Said decoder system may comprise one or more devices. Said views may be shaped like a frustum, pyramid or cone, for example. Said metadata is associated with said plurality of viewpoints and comprises 3D position information. Said metadata may describe other characteristics of each view, e.g. viewing direction and/or field of view. Inclusion of the viewing direction and/or field of view in the metadata is beneficial if the views do not all have the same viewing direction and/or field of view, e.g. if one or more of the viewpoints are inside a point cloud, and viewpoints are not associated with default viewing directions.

Preferably, at least one of the one or more available viewpoints is selected in such a way that the corresponding at least one available view is most similar of the available views to a desired user view (which corresponds to the desired user viewpoint). The decoder system may first select one or more views in this way and then further select the closest view to the volumetric image in order to achieve the highest quality. Rendering may happen in parallel to decoding (e.g. partially decoded point clouds may already be rendered). In the case of multiple views, each view may be rendered individually.

Since the desired user viewpoint is often not exactly the same as one of the available viewpoints, some adjustment is typically needed by the decoder system to adjust a decoded view to the desired user viewpoint. In order to prevent that invisible data is rendered or to reduce the amount of invisible data that is rendered, the decoder system may perform occlusion culling and/or frustum culling to obtain the adjusted view.

In an embodiment, the decoder system comprises a CPU, a desired viewpoint generator (e.g. an HMD, a mouse or other input device), a GPU, and optionally a display. In this embodiment, the rendering happens on the GPU, but the CPU will receive the desired viewpoint, and instruct the GPU to render. The decoded image may be stored into memory and then sent to whatever system requires it, e.g. the GPU, the system bus, and/or network interfaces.

Said at least one processor may be configured to determine a further desired user viewpoint, select a further available viewpoint from said available viewpoints based on said further desired user viewpoint, obtain a further set of volumetric image data in which a further available view corresponding to said further available viewpoint has been encoded, decode said further available view from said further set of volumetric image data, fuse said decoded further available view with said at least one decoded available view, and optionally render said fused further available view after or instead of rendering said at least one decoded available view.

The fusing may be used to prevent inconsistencies in the rendering when switching viewpoints. The fusing typically involves smoothing of views using known techniques in order to hide 'seams' between different views of different viewpoints which can be introduced due to lossy compression artifacts, and/or overlap between views. Not only may the desired user viewpoint change from one moment to another, also the available viewpoints may change per frame or sequence of frames. In both cases, a new selection needs to be made from the available viewpoints.

Said at least one processor may be configured to obtain a further set of volumetric image data in which data from one or more related views has been encoded, said one or more related views being related to said one or more available views, decode at least one of said one or more related views from said further set of volumetric image data, fuse said decoded at least one related view with said decoded at least one available view, and optionally render said fused views.

Said one or more related views may be considered related to said one or more available view when:

They are defined as such by a content creator (e.g. creating groups of views). This is helpful in scenarios with a limited set of user positions. Such scenarios are commonly defined as a graph of scenes or positions within one or more scenes.

They have somewhat common attributes (e.g. difference in viewing direction is smaller than a constant c, or their relative distance is smaller than a constant d).

Automatically generated views may be grouped by the encoder system. For example, if the encoder system starts out with a set of 'anchor' views, but needs more views to cover more of the scene, it may define additional views related to an already-known view.

Said one or more related views may be adjacent, separate, or overlapping, for example. A related view may partly overlap with said available view or one of these two views may be entirely comprised in the other view. Since the desired user viewpoint is often not the same as one of the available viewpoints, one available view may not comprise all the data that is visible from the desired user viewpoint. By obtaining related views and fusing these related views, all data that is visible from the desired viewpoint may be obtained and rendered. In this case, fusing is not only performed when switching viewpoints. View-frustum culling and/or occlusion culling may be performed on the fused views.

In certain situations, the further set (i.e. the related views) may be obtained before the first set is obtained, e.g. because the first set of image data takes longer to fetch (e.g. perhaps because it contains more points or is harder to compress) than the further set. In this case, the further set may be decoded and rendered when the first set has not been decoded and rendered (yet). For example, the first set may arrive too late and the further set may then be the only one available. This makes it possible show at least something which may be more relevant to a user than showing nothing at all. The further set may also be obtained before the first set is obtained if the further set has been pre-fetched, e.g. based on estimated user movement, for content that is not (completely) real-time.

Said at least one processor may be configured to obtain metadata indicating said available viewpoints and specifying where to obtain sets of volumetric image data in which available views corresponding to said available viewpoints have been encoded, or parts of said sets.

Said metadata may further indicate a viewing direction and/or field of view and/or further viewpoint configuration for each of said available viewpoints. Examples of further viewpoint configurations are camera projection type, camera orientation, near/far clipping planes, zoom level, lens shape, speed, acceleration, anti-aliasing level, anti-aliasing type, anisotropic filtering level, gamma correction, contrast, and brightness.

In a third aspect of the invention, a method of encoding volumetric image data comprises obtaining an input set of volumetric image data, selecting data from said volumetric image data for each of a plurality of views on said volumetric image data based on a visibility of said data from a respective viewpoint at a respective viewing direction and/or within a respective field of view such that a plurality of said views comprises only a part of said volumetric image data, encoding each of said views as a separate output set of volumetric image data, and generating metadata, said metadata indicating said plurality of viewpoints. Said method may be performed by software running on a programmable device. This software may be provided as a computer program product.

In addition to the plurality of views, the entire input set of volumetric image data may also be encoded as a separate output set of volumetric image data. This might be used for example to provide a low-quality version of the entire input set of volumetric image data at any point in time, hence avoiding an "empty void" effect where no data corresponding to a part of the scene can be displayed, If a client has enough bandwidth and computation resources after downloading the low-quality version, it would then be able to choose to fetch high-quality available volumetric image data to replace the low-quality ones. This way, even in rapid movement of the user and high network latency, the scene can always be rendered.

In a fourth aspect of the invention, a method of decoding encoded volumetric image data comprises determining a desired user viewpoint, obtaining metadata associated with said encoded volumetric image data, said metadata indicating available viewpoints, each of said available viewpoints corresponding to an available view, selecting one or more of said available viewpoints based on said desired user viewpoint, obtaining, based on said selected one or more viewpoints, one or more sets of volumetric image data in which one or more available views corresponding to said selected one or more available viewpoints have been encoded, decoding at least one of said one or more available views from said one or more sets of volumetric image data, and optionally rendering said at least one of said decoded one or more available views (or part thereof). Said method may be performed by software running on a programmable device. This software may be provided as a computer program product.

The metadata may be received before a content item associated with the metadata is rendered or selecting the content item and receiving the metadata may be performed in parallel, for example. The content item may be selected after the desired user viewpoint has been determined. For example, the content item may be selected based on the desired user viewpoint if there are multiple content items with similar content.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: obtaining an input set of volumetric image data, selecting data from said volumetric image data for each of a plurality of views on said volumetric image data based on a visibility of said data from a respective viewpoint at a respective viewing direction and/or within a respective field of view such that a plurality of said views comprises only a part of said volumetric image data, encoding each of said views as a separate output set of volumetric image data, and generating metadata, said metadata indicating said plurality of viewpoints.

A non-transitory computer-readable storage medium stores at least a second software code portion, the second software code portion, when executed or processed by a computer, being configured to perform executable operations comprising: determining a desired user viewpoint, obtaining metadata associated with said encoded volumetric image data, said metadata indicating available viewpoints, each of said available viewpoints corresponding to an available view, selecting one or more of said available viewpoints based on said desired user viewpoint, obtaining, based on said selected one or more viewpoints, one or more sets of volumetric image data in which one or more available views corresponding to said selected one or more available viewpoints have been encoded, decoding at least one of said one or more available views from said one or more sets of volumetric image data, and optionally rendering said at least one of said decoded one or more available views (or part thereof). The two software portions could be run independently and typically do not require each other to function independently.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like, functional programming languages, hardware description languages, and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
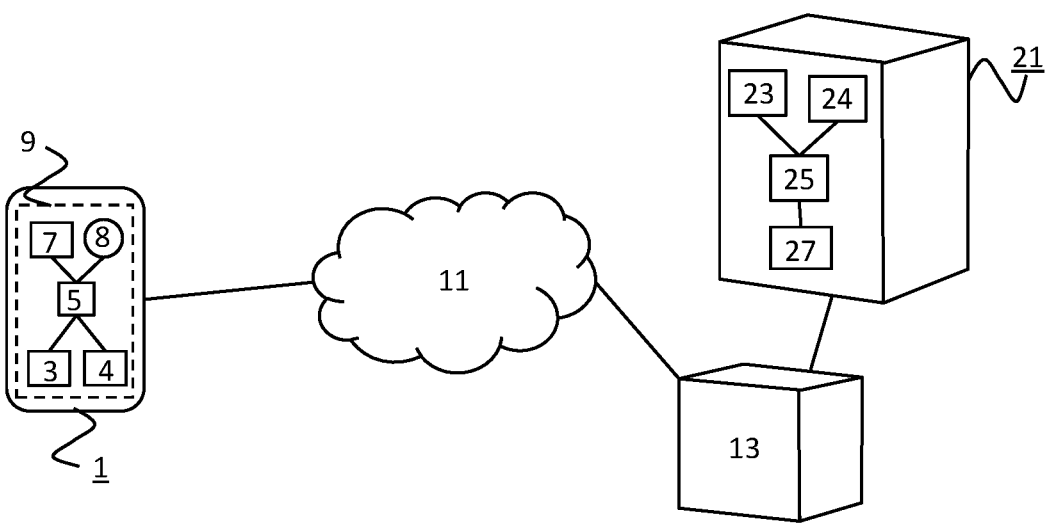
FIG. 1 is a block diagram of an embodiment of the encoder system and an embodiment of the decoder system.

FIG. 1 shows an embodiment of an encoder system, a computer 21, and an embodiment of a decoder system, a mobile device 1. The computer 21 comprises a receiver 23, a transmitter 24, a processor 25, and storage means 27. The processor 25 is configured to obtain an input set of volumetric image data, e.g. comprising one or more point clouds, and select data from the volumetric image data for each of a plurality of views on the volumetric image data based on a visibility of the data from a respective viewpoint at a respective viewing direction and/or within a respective field of view such that a plurality of the views, e.g. each of the views, comprises only a part of the volumetric image data. The term viewpoint refers to a position. Multiple views are possible from a certain viewpoint, e.g. depending on the viewing direction.

The processor 25 is further configured to encode each of the views as a separate output set of volumetric image data and generate metadata which indicates the plurality of viewpoints. The metadata is associated with the plurality of viewpoints and may comprise 3D position information. The metadata may describe other characteristics of each view, e.g. viewing direction and/or field of view. Multiple output sets may be associated with the same metadata/viewpoints, e.g. if the multiple output sets represent multiple qualities of the same content. Information specifying which viewpoints and/or viewing directions and/or fields of view are to be used may be obtained from input data, e.g. from the same input data that comprises the input set. The viewing directions and/or fields of view may alternatively be default viewing directions and/or default fields of view, for example. In the example of FIG. 1, the computer 21 provides the output sets and metadata to a server computer 13.

A default viewing direction and/or field of view is a viewing direction and/or field of view that is known at runtime and is not provided in signaling information. Different use-cases may use different default values. A default value may be dynamically dependent on another default value (but only one set of (static+dynamic) default parameters normally exists for any set of static default parameters). The decoder system and encoder may obtain the default values, for example, by compiling the default values into the software, by specifying rules (e.g. in a standard) how the default values can be calculated/determined, or by having another component determine the values and provide them as input to the encoder system and decoder system.

The mobile device 1 comprises a transceiver 3, a transmitter 4, a processor 5, memory 7, a camera 8 and a display 9. The processor 5 is configured to determine a desired user viewpoint, e.g. using the camera 8, and obtain metadata associated with encoded volumetric image data from the server computer 13 through medium 11, e.g. a computer network such as the Internet. The metadata indicates available viewpoints of which each of the available viewpoints corresponds to an available view. The processor 5 is further configured to select one or more of the available viewpoints based on the desired user viewpoint, obtain from the server computer 13, based on the selected one or more viewpoints, one or more sets of volumetric image data in which one or more available views corresponding to the selected one or more available viewpoints have been encoded, and decode at least one of the one or more available views from the one or more sets of volumetric image data.

The mobile device 1 may select the available viewpoint in such a way that the corresponding view is most similar of the available views to a desired user view (which corresponds to the desired user viewpoint). Alternatively, the mobile device 1 may first select one or more views in this way and then further select the closest view to the object in order to achieve the highest quality. Rendering may happen in parallel to decoding (e.g. partially decoded point clouds may already be rendered). In the case of multiple views, each view may be rendered individually.

In the embodiment of FIG. 1, the decoder system is a mobile device and renders at least one of the decoded one or more available views. In an alternative embodiment, the decoder system is a different device, e.g. a PC, is part of a device, e.g. a mobile device, or comprises multiple devices. In the example of FIG. 1, the mobile device 1 obtains the metadata and volumetric image data from the server computer 13. Alternatively, the mobile device may obtain the metadata and the volumetric image data from memory 7.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example. The camera 8 may comprise a CCD or CMOS sensor, for example.

The receiver 3 and the transmitter 4 may use one or more wireless communication technologies, e.g. Wi-Fi (IEEE 802.11) for communicating with other devices, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of the computer 21 shown in FIG. 1, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with other devices, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

Figure 2:
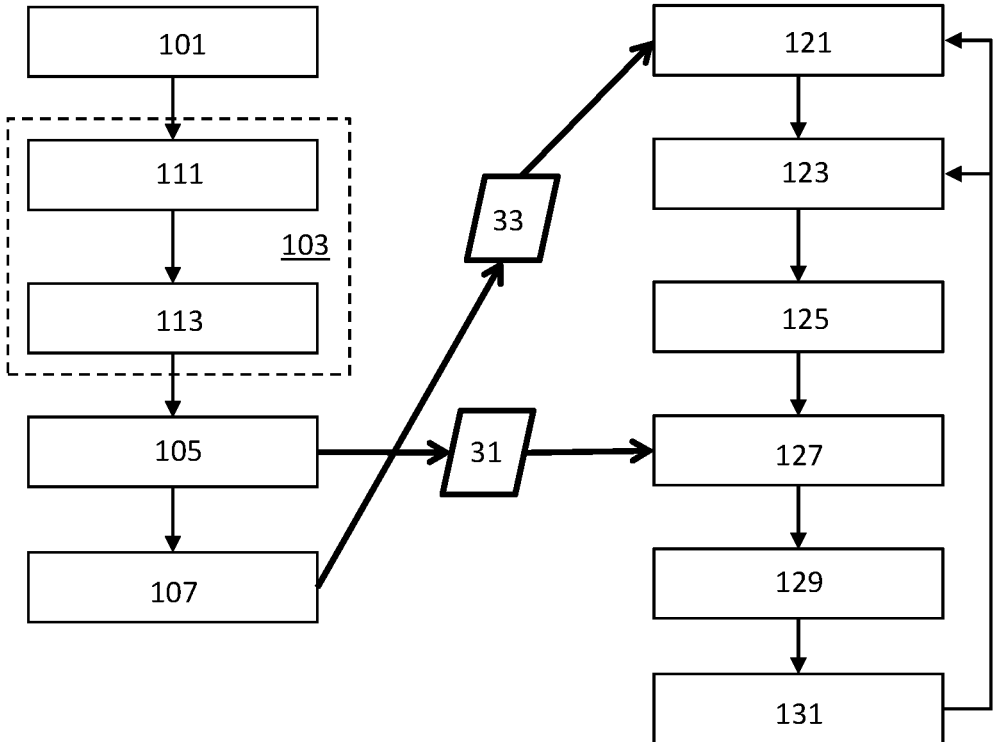
FIG. 2 is a flow diagram of an embodiment of the encoding method and a first embodiment of the decoding method.

An embodiment of the method of encoding volumetric image data and a first embodiment of the method of decoding encoded volumetric image data are shown in FIG. 2. A step 101 comprises obtaining an input set of volumetric image data. The input set of volumetric image data may comprise one or more point clouds or may comprise 3D meshes, RGB+D image data or voxels, for example. A point cloud is a set of 3D points of which each point may or may not have associated properties (e.g. color, luminosity). Points of a point cloud may have a 3D normal vector associated with them.

A point cloud may be provided as a '.ply' file, for example. This file can be parsed and stored into RAM memory using known techniques. The stored point cloud may be copied from RAM to GPU memory as part of a GPU algorithm, for example. A point cloud may be generated from a set of one or more RGB+D inputs (e.g. as captured by RGB+D sensors). If there is more than a single RGB+D input, points may be fused to improve the smoothness of the point cloud.

If the volumetric image data comprises multiple point clouds, these point clouds compose a single scene, i.e. are related in space. For example, one point cloud may represent a table in a room and another point cloud may represent a chair in the same room. If the volumetric image data comprises multiple point clouds, it may be possible to perform culling only on a subset of these multiple point clouds.

The input set of volumetric image data may change over time and the at least one processor may be configured to repeatedly select the data from the volumetric image data for each of the views and encode each of the views as separate bitstreams.

A step 103 comprises selecting data from the volumetric image data for each of a plurality of views on the volumetric image data based on a visibility of the data from a respective viewpoint at a respective viewing direction and/or within a respective field of view such that a plurality of the views, e.g. each of the views, comprises only a part of the volumetric image data. In the embodiment of FIG. 2, step 103 comprises sub steps 111 and 113.

Step 111 comprises defining multiple viewpoints for the input set and making an initial data selection for the views corresponding to these viewpoints. The viewpoints may be chosen such that the corresponding views collectively comprise all of the volumetric image data. This allows the user to view all of the volumetric image data by changing the user viewpoint. Alternatively, some of the data, e.g. points, may not be included in any of the views, e.g. because they are hidden from every viewpoint or just to reduce encoding work/time.

A set of viewpoints may be received as input. For example, the following JSON schema specifies a data structure that can be used to specify these viewpoints:

```
{
    "viewpoints": [{
        "location": [0.0, 0.0, 0.0],
        "orientation": [0.79, −3.14, 3.14]
    }, {
        "location": [10, 3, −2.4],
        "orientation": [1.57, −3.14, 0.0]
    }, {
        "location": [9, 3, −2.4],
        "orientation": [1.57, −3.14, 0.0]
    }],
    "camera": {
```

-continued

```
        "projection": "perspective"
        "fov": 60.0,
        "near": 0.01,
        "far": 30.0,
        "ssaa": 4
    }
}
```

In this example, locations are specified in the same units as an input point cloud. The orientation is specified as Tait-Bryan angles in radians. The projection type is chosen from a list (e.g. orthogonal, perspective, cylindrical, spherical, or the projection type disclosed in WO2018/215502 A1). The camera field of view is specified in degrees. The near and far clipping planes are specified in the same units and coordinate space as the input point cloud. The supersampling rate is specified as the number of subsamples per pixel.

All of the volumetric image data which is visible from the corresponding viewpoint at the corresponding viewing direction and/or within the corresponding field of view from the volumetric image data may be initially selected for each view.

Alternatively, some data that is visible from the respective viewpoint at the respective viewing direction may be omitted, e.g. if this data does not add much to the rendering or just to reduce encoding work/time. For example, at certain viewing directions, two points that do not overlap in a point cloud may significantly overlap (and one of them may barely be visible) when they are rendered, and they may therefore not need to both be rendered.

In a first implementation of this step, viewpoints and views are determined as follows. First, a virtual sphere is constructed at a point c within a point cloud space (e.g. the point c can be the centroid of all points) with radius r. Depending on the desired coverage level, positions on this sphere are selected as viewpoints. The rotation of the views is chosen such that the viewpoints look at the point c (e.g. the center of the virtual sphere). In order to increase coverage, the process can be repeated for different values of {r,c}.

"Coverage level" can be defined as an abstract metric on how many points are included, e.g.:
1. The ratio of included points vs excluded points (e.g., one could define a minimum coverage of 80% of all points).
2. An absolute number of included points (e.g. one could define a minimum coverage level of 100.000 points).
3. Combinations of the above, e.g. the lowest of 40% or 100.000 points.

Definition 2) is particularly useful when a specific target bandwidth is to be reached, as the desired coverage level can be set to this value (the amount of points is correlated with the bandwidth usage). However, definition 2) does not take into account how accurate such a representation can ever be (e.g. the boundary does not take the relative loss of information into account).

In a first variant of this first implementation, i.e. a second implementation, c remains constant, where r is reduced step-wise by a constant amount e in a number of constant steps n.

In a second variant of this first implementation, i.e. a third implementation, when generating a set of suitable viewpoints and views, first a large set of views V is generated such that a minimum coverage level c is reached. Next, a subset of views $V' \subseteq V$ can be determined which reach a particular desired coverage level d (here, it may be that c=d). The result may be more efficient, as $|V'| \le |V|$.

The advantage of this second variant is that in some scenarios it is cheaper to first generate a big set of views, which provide more accuracy than needed/wanted (e.g. due to bandwidth limitations). In this second variant, viewpoints are then dropped based on their contribution to the coverage level (e.g. if two views are overlapping a lot (they are covering similar points), removing one or the other will not reduce the coverage level by much, but will save encoding/transmitting an entire view).

In a fourth implementation of this step, camera properties are specified on a viewpoint-by-viewpoint basis.

Optionally, step 111 comprises selecting further data for the plurality of views based on a visibility of the further data from one or more respective further viewpoints which are related to the respective viewpoint. The data and the further data may correspond to adjacent or partially overlapping views, for example.

Since the desired user viewpoint is often not the same as one of the available viewpoints, some adjustment is typically needed by a decoder system to adjust a decoded view to the desired user viewpoint. By providing further data than only the data that is visible from the respective viewpoint at the respective viewing direction and/or within the respective field of view in the views, this adjustment may be determined from the obtained data set, i.e. data that is visible from the desired user viewpoint and not visible from the available viewpoint may be determined from the obtained data set.

The further data for a certain viewpoint may be selected by virtually moving this certain viewpoint or by selecting data near the data already selected for the view. The former leads to the best results (e.g. no omitted data), but the latter can be performed quicker. In an alternative embodiment, this further data is provided separately from the view (but associated with the view) as a further dataset.

Figures 3, 4, 5:
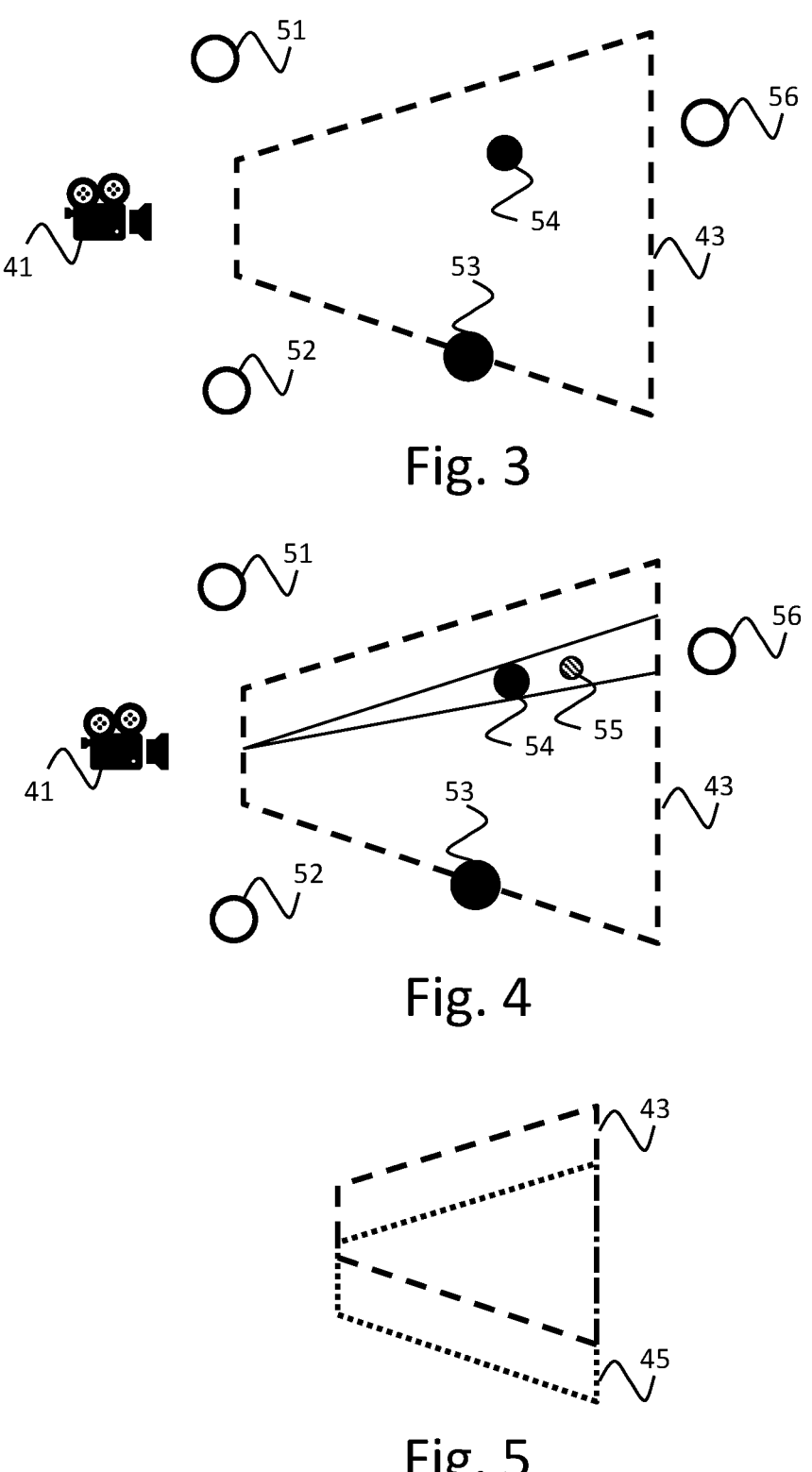
FIG. 3 shows an example of view frustum culling.
FIG. 4 shows an example of view frustum and occlusion culling.
FIG. 5 shows an example of a stereo view frustum.

Step 113 comprises culling the initial data selections for the views. The views may be shaped like a frustum, pyramid or cone, for example. FIG. 3 shows an example of view frustum culling. In this example, a view from a viewpoint 41 with a view frustum 43 is culled. In FIG. 3, five points of a point cloud are represented: points 51-54 and 56. Of these five points, only points 53 and 54 are located inside the view frustum 43. Point 51 is located to the left of the view frustum 43, point 52 is located to the right of view frustum 43, and point 56 is located behind view frustum 43. Points 51, 52 and 56 are therefore culled, i.e. removed from the initial selection.

FIG. 4 shows an example of view frustum and occlusion culling. In the example of FIG. 4, an additional, occluded point 55 is represented. This point 55 is not visible from viewpoint 41 and therefore culled, i.e. removed from the initial selection. As previously described, occlusion culling and view frustum culling are known techniques.

A single wide view (e.g. frustum-shaped) may be used to render the view of two eyes simultaneously. This is shown in FIG. 5. In the example of FIG. 5, a second view frustum 45 is represented, which forms a stereo view frustum together with view frustum 43 of FIGS. 3 and 4.

Culling may be performed using rasterization or ray tracing, for example. In a first implementation of this step, the point cloud is rendered using a set point size for occlusion detection and the culled point cloud is then reconstructed based on color and depth buffers.

Alternatively, the point cloud may be rendered point by point and a list of points to include or a list of points to exclude may be maintained. In a second implementation of this step, after initializing a list of points to include, the point cloud is rendered using rasterization. If during rendering, a point is determined to not be visible, it is included in the exclusion list. If a point is determined to be visible, it is not included in the exclusion list. The culled point cloud consists of all points of the original point cloud except those points which are in the exclusion list.

In a third implementation of this step, after initializing a list of points to include, the point cloud is rendered point by point using ray tracing. If during raytracing, a point is determined to be visible, it is included include in the output list. If a point is determined to not be visible, it is not included in the output list. The culled point cloud consists of all points in the output list. The benefit of ray tracing is that occlusion can be gained 'for free', as part of the visibility detection of the ray tracing algorithm and it is potentially relatively fast due to recent ray tracing oriented hardware acceleration technology in GPUs, for example RTX in Nvidia GPUs.

Figures 6, 7, 8:
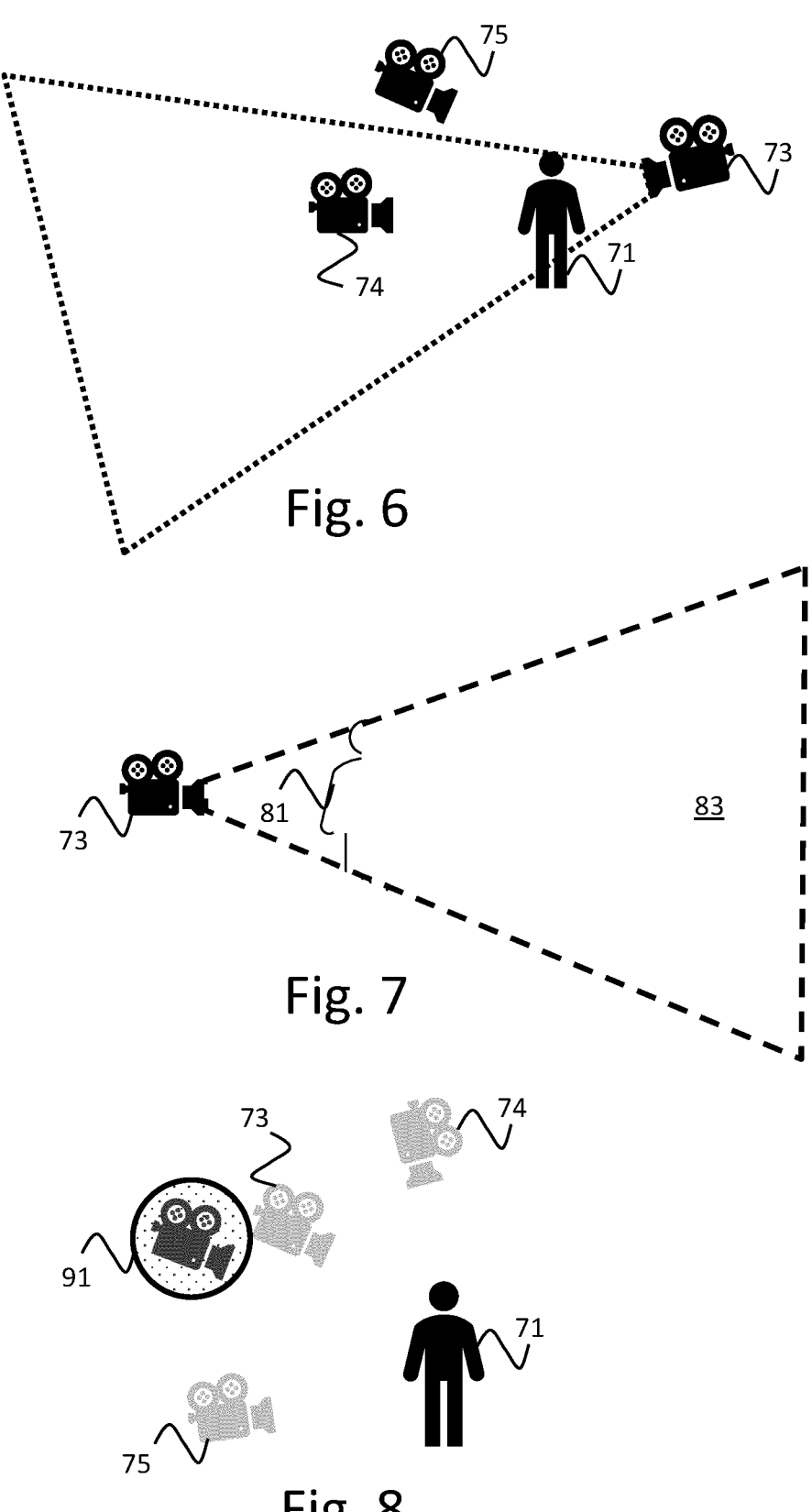
FIG. 6 shows an example of a point cloud and three viewpoints.
FIG. 7 shows a view corresponding to one of the viewpoints of FIG. 6.
FIG. 8 shows an example of a user viewpoint.

FIG. 6 shows an example of a point cloud 71 and three viewpoints 73-75. In this example, the point cloud 71 represents a person. A field of view and viewing direction of viewpoint 73 is shown in FIG. 6. View 83, see FIG. 7, comprises the data visible from the viewpoint 73 in this field of view: a (strict) subset 81 of the point cloud 71.

A step 105 comprises encoding each of the views as a separate output set of volumetric image data. The resulting output sets 31 may be provided to a server computer, for example. Encoding may simply involve creating a file per output set and including the selected data in the file or may involve compressing the selected data. Techniques for compression of point clouds are described in "Emerging MPEG Standards for Point Cloud Compression" by Sebastian Schwarz et al., published in IEEE Journal on Emerging and Selected Topics in Circuits and Systems, volume 9, issue 1, March 2019. An example of such a technique is MPEG video-based point cloud compression (V-PCC), which is targeted towards dynamic content. Multiple point clouds may be encoded in parallel.

In addition to the plurality of views, the entire input set of volumetric image data may also be encoded as a separate output set of volumetric image data. This might be used for example to provide a low-quality version of the entire input set of volumetric image data at any point in time, hence avoiding an "empty void" effect where no data corresponding to a part of the scene can be displayed. If a client has enough bandwidth and computation resources after downloading the low-quality version of a volumetric image, it would then be able to choose to fetch high-quality available volumetric image data to replace the low-quality ones. This way, even in rapid movement of the user and high network latency, the volumetric image can always be rendered.

A step 107 comprises generating metadata 33. The metadata indicates the plurality of viewpoints. In the embodiment of FIG. 2, step 107 is performed after step 111. In an alternative embodiment, step 107 is performed in parallel with step 111. The metadata may specify the positions of the viewpoints, but the metadata may also specify where to obtain the output sets of volumetric image data or parts of the output sets of volumetric image data. This gives the decoder system full control over which output sets/views to obtain. The metadata may be specified in a manifest file, e.g. a Media Presentation Description (MPD) for MPEG-DASH (ISO/IEC 23009-1), for example. In another embodiment, the metadata may be specified in an ISO Base Media File Format (ISOBMFF) data format where each output set of volumetric image data could be encapsulated into different tracks into the same ISOBMFF (ISO/IEC 14496-12) file.

An example of an MPD manifest is provided below:

```
<MPD xmlns="urn:mpeg:DASH:schema:MPD:2011"
mediaPresentationDuration="PT0H3M1.63S" minBufferTime="PT1.5S"
profiles="urn:mpeg:dash:profile:isoff-on-demand:2011"
type="static">
    <Period duration="PT0H3M1.63S" start="PT0S">
        <AdaptationSet>
            <ContentComponent contentType="pointcloud" id="1">
                <CameraLocation x="0" y="0" z="0" />
                <CameraOrientation yaw="30" pitch="0" roll="0" />
                <Offset x="0" y="-1" z="0" yaw="0"
                    pitch="0" roll="0" />
            </ContentComponent>
            <Representation bandwidth="4190760" codecs="ply" id="1"
mimeType="pointcloud/ply">
                <BaseURL>pointcloud_A.ply</BaseURL>
                <SegmentBase indexRange="674-1149">
                    <Initialization range="0-673" />
                </SegmentBase>
            </Representation>
        </AdaptationSet>
        <AdaptationSet>
            <ContentComponent contentType="pointcloud" id="1">
                <CameraLocation x="0" y="2" z="0" />
                <CameraOrientation yaw="10" pitch="90" roll="30" />
            </ContentComponent>
            <Representation bandwidth="4272532" codecs="ply" id="1"
mimeType="pointcloud/ply">
                <BaseURL>pointcloud_B.ply</BaseURL>
                <SegmentBase indexRange="674-1149">
                    <Initialization range="0-673" />
                </SegmentBase>
            </Representation>
        </AdaptationSet>
        <AdaptationSet>
            <ContentComponent contentType="audio" id="2" />
            <Representation bandwidth="127236" codecs="mp4a.40.2" id="6"
mimeType="audio/mp4" numChannels="2" sampleRate="44100">
                <BaseURL>pointcloud.mp4</BaseURL>
                <SegmentBase indexRange="592-851">
                    <Initialization range="0-591" />
                </SegmentBase>
            </Representation>
        </AdaptationSet>
    </Period>
</MPD>
```

In this example, different perspectives of the same point cloud are encoded as separate adaptation sets (the 3rd adaptation set is a synchronized audio track). A client can parse this MPD, and select a desired adaptation set for streaming. Based on the URL in the representations in the adaptation set, the client is able to download the selected point cloud over HTTP for rendering. Multiple periods can be used to allow changing parameters over a given interval.

In this example, the 'CameraLocation' tags define the location of the camera corresponding to the viewpoint, with the 'CameraOrientation' tags defining the rotation of the camera. Given that the views are encoded and stored independently, it may be that views have to be fused before rendering. For this purpose, the 'Offset' tag has been included, which specifies a transformation matrix to be applied to that particular view before rendering.

A step 121 comprises obtaining metadata 33 associated with the encoded volumetric image data. In the embodiment of FIG. 2, the metadata is associated with a content item (e.g. soccer match X vs. Y) and step 121 comprises selecting the content item, e.g. in response to user input, before the associated metadata is obtained. In an alternative embodiment, the metadata may be received before the content item is selected or no selection of a content item may be required.

As described in relation to step 107, the metadata 33 indicates available viewpoints and each of the available viewpoints corresponds to an available view. The metadata may further indicate a viewing direction and/or field of view and/or further viewpoint configurations for each of the available viewpoints. Examples of further viewpoint configurations are camera projection type, camera orientation, near/far clipping planes, zoom level, lens shape, speed, acceleration, anti-aliasing level, anti-aliasing type, anisotropic filtering level, gamma correction, contrast, and brightness.

A step 123 comprises determining a desired user viewpoint. The user may be able to request a view from a new viewpoint by using a controller (e.g. in case of virtual reality) or by shifting his/her head or mobile device or moving around (e.g. in case of augmented reality). This desired viewpoint does not necessarily match one of the available viewpoints.

In an alternative embodiment, steps 121 and 123 are performed in a different order. In the embodiment of FIG. 2, the content item is selected before a desired user viewpoint is determined. In an alternative embodiment, the content item may be selected after the desired user viewpoint has been determined. For example, the content item may be selected based on the desired user viewpoint if there are multiple content items with similar content. In this alternative embodiment, step 123 would normally be performed before step 121.

A step 125 comprises selecting one or more of the available viewpoints based on the desired user viewpoint. FIG. 8 shows an example of a desired user viewpoint: user viewpoint 91. FIG. 8 further shows the three available viewpoints 73-75.

In a first implementation of this step, step 125 comprises determining the view corresponding to the user viewpoint 91 and the views corresponding to the available viewpoints 73-75, comparing the overlap between the user view and each of the available views and selecting the available viewpoint corresponding to the available view with the greatest overlap.

In a second implementation of this step, step 125 comprises determining the distance between the user viewpoint 91 and each of the available viewpoints 73-75 and selecting the nearest available viewpoint. Thus, the viewing direction is disregarded. This second implementation is beneficial when all viewpoints are known to point towards the point cloud. With both implementations, available viewpoint 73 would be selected in the example of FIG. 8.

As an extension of these two implementations, a prioritized list of viewpoints may be created, ranked by desirability. The view corresponding to the best matching viewpoint of the list would then be obtained first, but more available views could be obtained if there is time left, according to the prioritized list of viewpoints (e.g. 2nd best, 3rd best, etc.).

A step 127 comprises obtaining, based on the selected one or more viewpoints, one or more sets of volumetric image data 31 in which one or more available views corresponding to the selected one or more available viewpoints have been encoded.

In a first implementation of this step, the sets of volumetric image data are files that are published by a server computer using MPEG DASH. Each file may comprise a subset of a point cloud and files can be streamed to multiple clients/decoder systems.

In a second implementation of this step, a server computer streams volumetric image data, e.g. a file comprising a view, over a media streaming protocol (such as RTP). As common in such a streaming scenario, before streaming starts, SIP may be used to negotiate the transfer of the stream. To implement this, a new SDP message part may need to be defined which can be used to signal the different viewpoints. This new SDP message would already be transmitted and received, respectively, in steps 107 and 121, respectively. For example, the following message part may be defined for the streaming of views on a point cloud, which may be included for each viewpoint:

```
. . .
m=pointcloud <port> RTP/AVP 99
a=rtpmap:<ply RTP payload type> VPCC/<clock rate>
a=viewpoint:<viewpoint id> <x> <y> <z> <yaw> <pitch> <roll>
. . .
```

In this example, the 'viewpoint id' is a session-unique integer identifying that viewpoint, 'x', 'y' and 'z' are floating point numbers denoting the position of the viewpoint, whereas 'yaw', 'pitch' and 'roll' are floating point numbers denoting the respective rotation of the associated camera.

An example of complete SDP messages is provided below. The SDP messages are used to negotiate the streaming of views on a point cloud. In this example, the RTP payload type for point clouds is assumed to be '2019':

Alice offers to send a point cloud with three viewpoints:

```
v=0
o=alice 2890844526 2890844526 IN IP4 host.atlanta.example.com
s=
c=IN IP4 host.atlanta.example.com
t=0 0
m=audio 49170 RTP/AVP 0 8 97
a=rtpmap:0 PCMU/8000
a=rtpmap:8 PCMA/8000
a=rtpmap:97 iLBC/8000
m=pointcloud 51372 RTP/AVP 31 32
a=sendonly
a=rtpmap:2019 VPCC/90000
a=viewpoint:0 0.1 0 5 30 0 0
a=viewpoint:1 0 3 2 340 210 30
a=viewpoint:2 3 0 2 140 10 240
```

Bob answers with the request to receive the viewpoint with id 1.

```
v=0
o=bob 2808844564 2808844564 IN IP4 host.biloxi.example.com
s=
c=IN IP4 host.biloxi.example.com
t=0 0
m=audio 49172 RTP/AVP 99
a=rtpmap:99 iLBC/8000
m=pointcloud 51374 RTP/AVP 99
a=rtpmap:2019 VPCC/90000
a=viewpoint:1 0 3 2 340 210 30
```

According to the SIP protocol, the negotiation is now completed, and Alice can start transmitting the corresponding view to Bob. Once Bob wants to receive a view corresponding to a different viewpoint, SDP renegotiation can be used to achieve this.

In a third implementation of this step, the streaming is achieved using WebRTC with the same kind of signaling as in the second implementation, but then using the JavaScript Session Establishment Protocol (JSEP).

In a fourth implementation of this step, the views are included in ISOBMFF containers. An ISOBMFF container may contain one or more point clouds, for example.

The goal is to obtain at least one view in step 127, but multiple views may be obtained if there is enough time. While streaming, the client may use a deadline to determine if there is enough time to fetch more data. These views may be used to provide a better approximation of the original image data. Which additional views are fetched exactly may be determined using an extended version of the selection algorithm (e.g. when viewpoints are ranked by similarity, the client can fetch $2^{nd}$ similar viewpoint, $3^{rd}$ similar viewpoint, etc.), as described in relation to step 125.

Fetching random additional viewpoints may also be helpful for later processing, e.g. in case the client needs to display the next frame and no new frame data is available. When a current point cloud is one in a set of multiple consecutive point clouds (e.g. an animated point cloud) and the client misses the deadline for the next point cloud, the additionally fetched views can be used to display the current point cloud from different angles than the view which was fetched first. The current point cloud and the next point cloud may also be referred to as the current frame and the next frame of the point cloud.

The additional views may have a different quality than the primary view. A DASH-like client-based quality selection mechanism may be used, the ABR or BOLA algorithms for example. If the user has multiple viewpoints, e.g. one for each eye, multiple perspectives may be streamed simultaneously (e.g. in a single stream/video). For some point clouds, this may result in an improvement in coding efficiency. These streams can be spatially arranged (e.g. in a quilt pattern or side-by-side) as a sequence of one or more image such that they are directly usable by holographic and/or light field displays.

A step 129 comprises decoding at least one of the one or more available views from the one or more sets of volumetric image data. The client typically uses a state-of-the-art decoder for decoding the obtained view(s), according to its format. For example, in an embodiment where a point cloud is encoded using V-PCC, a state-of-the-art V-PCC decoder would typically be used to decode the view(s). Multiple views/point clouds may be decoded in parallel.

An optional step 131 comprises rendering at least one of the decoded one or more available views. Known techniques may be used for rendering the view(s), e.g. point cloud rendering techniques. Because view frustum culling has already been performed, the size of the data will in most cases already have been significantly reduced. Therefore, even with regular state-of-the-art rendering, the total work required will be reduced when using these methods. However, if the obtained available view is larger than the desired user view, additional view frustum culling may be performed in step 131.

Since the desired user viewpoint is often not the same as one of the available viewpoints, some adjustment is typically needed by the decoder system to adjust a decoded view to the desired user viewpoint. It may therefore be beneficial to perform occlusion culling in step 131. In the embodiment of FIG. 2, occlusion culling is also performed by the encoder system in step 113, sub step of step 103. In an alternative embodiment, no occlusion culling is performed in step 103 by the encoder system.

If no occlusion culling is performed, use of a common overdraw algorithm by the decoder system ensures that occluded objects, e.g. points, are not rendered in front of visible objects. For example, an overdraw algorithm may be performed by taking all objects, and for each object, their relative distance to the camera is calculated. The resulting list of distances is then sorted, and objects are drawn in furthest-to-closest order. Step 121 or 123 is repeated after step 131, after which the method continues as shown in FIG. 2. In the next iteration of step 123, a further desired user viewpoint is determined.

The implementations described with respect to FIG. 2 involve the use of point clouds but are not restricted to point clouds only. Same or similar implementations may involve the use of a different type of volumetric data.

Several options exist to ensure that enough data is obtained to populate the desired user field of view at a desired user viewpoint that deviates from an available viewpoint, including:

The field of view of the available views may be made larger than the field of view of the user. This has been described in relation to step 111 and will also be described in relation to FIG. 10.

One or more related views may be obtained and fused with the primary view. This will be described in relation to FIG. 9.

Figure 9:
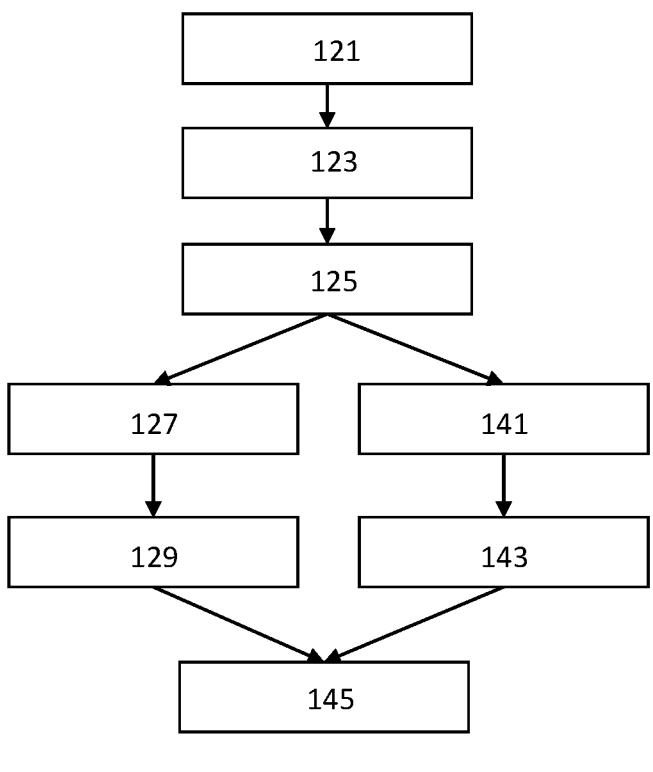
FIG. 9 is a flow diagram of a second embodiment of the decoding method.

A second embodiment of the method of decoding encoded volumetric image data is shown in FIG. 9. In this second embodiment, one or more related views are obtained and fused with the primary view.

Step 121 comprises obtaining metadata associated with the encoded volumetric image data. Step 123 comprises determining a desired user viewpoint. Step 125 comprises selecting an available viewpoint based on the desired user viewpoint.

Step 127 is performed after step 125. Step 127 comprises obtaining, based on the selected viewpoint, a set of volumetric image data in which an available view corresponding to the selected available viewpoint has been encoded. Step 129 comprises decoding the available view from the set of volumetric image data.

In addition to step 127, a step 141 is performed after step 125. Step 141 comprises obtaining a further set of volumetric image data in which data from one or more related views has been encoded. The one or more related views are related to the available view. The one or more related views may be adjacent, separate, or overlapping, for example.

The one or more related views may be considered related to the one or more available view when:

They are defined as such by a content creator (e.g. creating groups of views). This is helpful in scenarios with a limited set of user positions. Such scenarios are commonly defined as a graph of scenes or positions within one or more scenes.

They have somewhat common attributes (e.g. difference in viewing direction is smaller than a constant c, or their relative distance is smaller than a constant d).

Automatically generated views may be grouped by the encoder system. For example, if the encoder system starts out with a set of 'anchor' views, but needs more views to cover more of the scene, it may define additional views related to an already-known view.

A related view may partly overlap with the available view or one of these two views may be entirely comprised in the other view. A step 143 is performed after step 141. Step 143 comprises decoding at least one of the one or more related views from the further set of volumetric image data.

A step 145 is performed after steps 129 and 143. Step 145 comprises fusing the decoded at least one related view with the decoded available view. Step 131 of FIG. 2 (not shown in FIG. 9) may be performed after step 145. In that case, the fused views are rendered in step 131. View-frustum culling and/or occlusion culling may be performed on the fused views.

Figure 10:
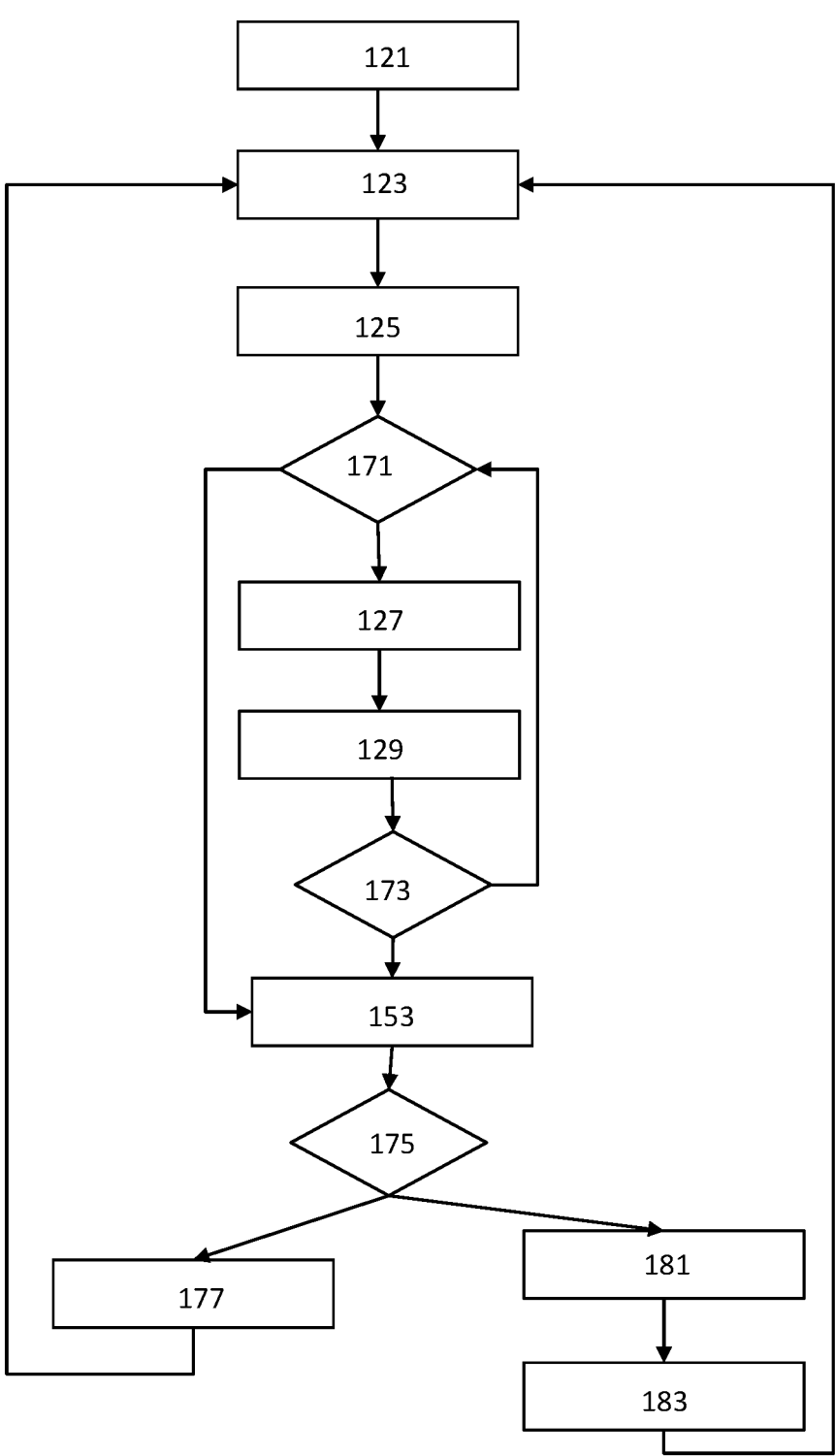
FIG. 10 is a flow diagram of a third embodiment of the decoding method.

A third embodiment of the method of decoding encoded volumetric image data is shown in FIG. 10. In the embodiment of FIG. 9, multiple views are fused at all times (or alternatively, most of the time). In the embodiment of FIG. 10, this is normally not necessary, because the field of view of the available views is made larger than the field of view of the user to allow the obtained view to be adjusted to the desired user viewpoint. However, when the user changes his desired viewpoint, e.g. by moving his head, by moving around or by using a controller, another (e.g. nearer) viewpoint may become preferable to the current one.

In this case, it is desirable to transition to another one of the available views. To enable this transition, it may be beneficial to render two views together during this transition. These two views are normally rendered simultaneously by the same algorithm. When rendering multiple views from multiple viewpoints, points can be fused (denoised, averaged, smoothed, deduplicated, and/or removed) to ensure a smooth transition between the multiple views.

Step 121 comprises obtaining metadata associated with the encoded volumetric image data. Step 123 comprises determining a desired user viewpoint. Step 125 comprises selecting one or more available viewpoints based on the desired user viewpoint.

If the desired user viewpoint is identical to a certain available viewpoint or an available view corresponding to a certain available viewpoint comprises all data visible from the desired user viewpoint, then only this certain viewpoint is selected. Thus, all data that is visible from the desired user viewpoint is then obtained without requiring multiple views to be obtained (in their entirety). A step 171 is performed after step 125.

Step 171 comprises checking whether view data of at least one of the selected viewpoints has not been obtained yet. If so, steps 127 and 129 are performed for one of the selected viewpoints. Step 127 comprises obtaining, based on this selected viewpoint, a set of volumetric image data in which an available view corresponding to this selected available viewpoint has been encoded. Step 129 comprises decoding this available view from the set of volumetric image data.

If it is determined in step 171 that views corresponding to of all the selected viewpoints have been obtained, step 175 is performed next. A step 173 is performed after steps 127 and 129. Step 173 comprises checking whether there is still a selected viewpoint whose view data has not been obtained yet. If so, step 171 is repeated. If not, step 175 is performed next.

Step 175 comprises checking whether multiple viewpoints have been selected and multiple views have been obtained and decoded. If not, step 177 is performed. Optional step 177 comprises rendering the single decoded view. Step 123 is repeated after step 177 for a further desired user viewpoint, after which the method continues as shown in FIG. 10.

If it is determined in step 175 that multiple viewpoints have been selected and multiple views have been obtained and decoded, step 181 is performed next. Step 181 comprises fusing the multiple decoded available views. An optional step 183 comprises rendering the fused available views. Step 123 is repeated after step 183 for a further desired user viewpoint, after which the method continues as shown in FIG. 10. In an alternative embodiment, even if multiple viewpoints have been selected and multiple views have been obtained, only a subset of them may be used and step 177 may be performed if only one of the selected views is used.

The fusing of step 181 typically involves smoothing of views using known techniques in order to hide 'seams' between different views of different viewpoints (which can be introduced due to lossy compression artifacts, and/or overlap between views). Not only may the desired user viewpoint change from one moment to another, also the available viewpoints may change per frame or sequence of frames. In both cases, a new selection needs to be made from the available viewpoints.

In order to prevent that invisible data is rendered or to reduce the amount of invisible data that is rendered, occlusion culling and/or frustum culling may be performed in steps 177 and 183, which has as benefit that existing rendering pipelines can be left unchanged. The frustum culling is likely to happen faster than in the state of the art, because frustum culling was already performed in the encoder system. The same applies to occlusion culling if occlusion culling was performed in the encoder system.

Figure 11:
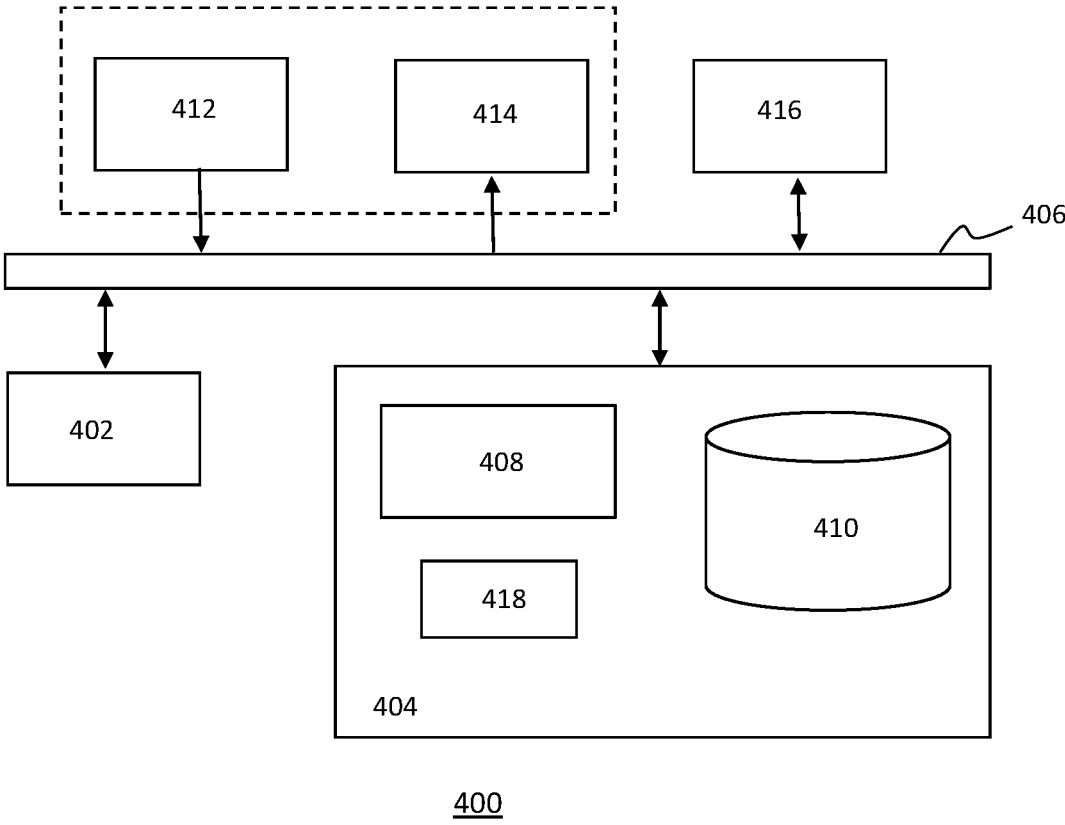
FIG. 11 is a block diagram of an exemplary data processing system for performing the methods of the invention.

FIG. 11 depicts a block diagram illustrating an exemplary data processing system that may perform the method as described with reference to FIGS. 2, 9 and 10.

As shown in FIG. 11, the data processing system 400 may include at least one processor 402 coupled to memory elements 404 through a system bus 406. As such, the data processing system may store program code within memory elements 404. Further, the processor 402 may execute the program code accessed from the memory elements 404 via a system bus 406. In one aspect, the data processing system may be implemented as a computer that is suitable for storing and/or executing program code. It should be appreciated, however, that the data processing system 400 may be implemented in the form of any system including a processor and a memory that is capable of performing the functions described within this specification.

The memory elements 404 may include one or more physical memory devices such as, for example, local memory 408 and one or more bulk storage devices 410. The local memory may refer to random access memory or other non-persistent memory device(s) generally used during actual execution of the program code. A bulk storage device may be implemented as a hard drive or other persistent data storage device. The processing system 400 may also include one or more cache memories (not shown) that provide temporary storage of at least some program code in order to reduce the number of times program code must be retrieved from the bulk storage device 410 during execution.

Input/output (I/O) devices depicted as an input device 412 and an output device 414 optionally can be coupled to the data processing system. Examples of input devices may include, but are not limited to, a keyboard, a pointing device such as a mouse, a 3DoF or 6DoF tracked controller, or the like. Examples of output devices may include, but are not limited to, a monitor or a display (e.g. an HMD or AR stereo display), speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 412 and the output device 414). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 416 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 400, and a data transmitter for transmitting data from the data processing system 400 to said systems, devices and/or networks. Modems, cable modems, and Ethernet cards are examples of different types of network adapter that may be used with the data processing system 400.

As pictured in FIG. 11, the memory elements 404 may store an application 418. In various embodiments, the application 418 may be stored in the local memory 408, he one or more bulk storage devices 410, or separate from the local memory and the bulk storage devices. It should be appreciated that the data processing system 400 may further execute an operating system (not shown in FIG. 11) that can facilitate execution of the application 418. The application 418, being implemented in the form of executable program code, can be executed by the data processing system 400, e.g., by the processor 402. Responsive to executing the application, the data processing system 400 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 402 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An encoder system, comprising at least one processor configured to:
obtain an input set of volumetric image data,
select data from said volumetric image data for each of a plurality of views on said volumetric image data based on a visibility of said data from a respective viewpoint either at a respective viewing direction, or within a respective field of view, or both, such that a plurality of said views comprises only a part of said volumetric image data, wherein selecting data for each of said views comprises view-frustum culling an initial data selection for each of the plurality of views,
encode each of said culled views as a separate output set of volumetric image data, and
generate metadata, said metadata indicating said plurality of viewpoints and comprising 3D position information.

2. An encoder system as claimed in claim 1, wherein said at least one processor is configured to:
select further data for said plurality of views based on a visibility of said further data from one or more respective further viewpoints, said one or more respective further viewpoints being related to said respective viewpoint.

3. An encoder system as claimed in claim 1, wherein said at least one processor is configured to specify in said metadata where to obtain said output sets of volumetric image data or parts of said output sets of volumetric image data.

4. An encoder system as claimed in claim 1, wherein said metadata further indicates either said plurality of viewing directions, said plurality of fields of view, or both, or further viewpoint configurations.

5. An encoder system as claimed in claim 1, wherein said input set of volumetric image data comprises one or more point clouds.

6. An encoder system as claimed in claim 1, wherein said at least one processor is configured to select said data from said volumetric image data for each of said plurality of views by selecting, for each respective view, all of said volumetric image data which is visible from said corresponding viewpoint either at said corresponding viewing direction, within said corresponding field of view, or both, from said volumetric image data.

7. An encoder system as claimed in claim 1, wherein said plurality of views collectively comprises all of said volumetric image data.

8. A decoder system, comprising at least one processor configured to:
determine a desired user viewpoint,
obtain metadata associated with encoded volumetric image data, said metadata indicating a plurality of available viewpoints, and comprising 3D position information, each of said plurality of available viewpoints corresponding to one or more available view-frustum culled views, select one or more of said plurality of available viewpoints based on said desired user viewpoint, obtain, based on said selected one or more viewpoints, one or more sets of volumetric image data in which one or more available culled views corresponding to said selected one or more viewpoints have been encoded, and decode at least one of said one or more available culled views from said one or more sets of volumetric image data.

9. A decoder system as claimed in claim 8, wherein said at least one processor is configured to:

determine a further desired user viewpoint, select a further available viewpoint from said available viewpoints based on said further desired user viewpoint, obtain a further set of volumetric image data in which a further available view corresponding to said further available viewpoint has been encoded, decode said further available view from said further set of volumetric image data, and fuse said decoded further available view with said at least one decoded available view.

10. A decoder system as claimed in claim 8, wherein said at least one processor is configured to:

obtain a further set of volumetric image data in which data from one or more related views has been encoded, said one or more related views being related to said available one or more available views, decode at least one of said one or more related views from said further set of volumetric image data, and fuse said decoded at least one related view with said decoded at least one available view.

11. A decoder system as claimed in claim 8, wherein said at least one processor is configured to obtain metadata indicating said available viewpoints and specifying where to obtain sets of volumetric image data in which available views corresponding to said available viewpoints have been encoded or parts of said sets.

12. A decoder system as claimed in claim 11, wherein said metadata further indicates either a viewing direction, field of view, or both, or further viewpoint configuration for each of said available viewpoints.

13. A method of encoding volumetric image data, comprising:

obtaining an input set of volumetric image data;

selecting data from said volumetric image data for each of a plurality of views on said volumetric image data based on a visibility of said data from a respective viewpoint either at a respective viewing direction, or within a respective field of view, or both, such that a plurality of said views comprises only a part of said volumetric image data wherein selecting data for each of said views comprises view-frustum culling an initial data selection for each of the plurality of views;

encoding each of said culled views as a separate output set of volumetric image data; and generating metadata, said metadata indicating said plurality of viewpoints and comprising 3D position information.

14. A method of decoding encoded volumetric image data, comprising:

determining a desired user viewpoint;

obtaining metadata associated with said encoded volumetric image data, said metadata indicating a plurality of available viewpoints, and comprising 3D position information, each of said plurality of available viewpoints corresponding to one or more view-frustrum available culled views;

selecting one or more of said plurality of available viewpoints based on said desired user viewpoint;

obtaining, based on said selected one or more viewpoints, one or more sets of volumetric image data in which one or more available culled views corresponding to said selected one or more available viewpoints have been encoded; and decoding at least one of said one or more available culled views from said one or more sets of volumetric image data.

15. A non-transitory computer-readable medium comprising non-transitory data representing a computer program or suite of computer programs comprising at least one software code portion or a computer program product storing at least one software code portion, the software code portion, when run on a computer system, being configured for performing the method of claim 13.

\* \* \* \* \*